United States Patent
Yazaki et al.

(10) Patent No.: US 11,894,741 B2
(45) Date of Patent: Feb. 6, 2024

(54) ROTARY ELECTRIC MACHINE SYSTEM

(71) Applicant: HONDA MOTOR CO., LTD., Tokyo (JP)

(72) Inventors: Manabu Yazaki, Wako (JP); Tatsuya Choji, Wako (JP); Naoki Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 15 days.

(21) Appl. No.: 17/584,443

(22) Filed: Jan. 26, 2022

(65) Prior Publication Data
US 2022/0255411 A1 Aug. 11, 2022

(30) Foreign Application Priority Data

Feb. 5, 2021 (JP) .................. 2021-017049

(51) Int. Cl.
*H02K 24/00* (2006.01)
*H02K 5/20* (2006.01)
*H02K 5/22* (2006.01)
*H02K 11/25* (2016.01)
*H02K 7/08* (2006.01)
*H02K 9/10* (2006.01)
*H02K 11/21* (2016.01)
*H02K 7/00* (2006.01)

(52) U.S. Cl.
CPC .......... *H02K 24/00* (2013.01); *H02K 5/207* (2021.01); *H02K 5/225* (2013.01); *H02K 7/003* (2013.01); *H02K 7/083* (2013.01); *H02K 9/10* (2013.01); *H02K 11/21* (2016.01); *H02K 11/25* (2016.01)

(58) Field of Classification Search
CPC ........ H02K 24/00; H02K 11/21; H02K 11/25; H02K 5/225; H02K 7/083; H02K 7/003

USPC ............................................ 310/71
See application file for complete search history.

(56) References Cited

U.S. PATENT DOCUMENTS

| | | | | |
|---|---|---|---|---|
| 2011/0221290 A1* | 9/2011 | Vedy | ...................... | H02K 5/225 310/71 |
| 2013/0106217 A1* | 5/2013 | Drye | ...................... | H02K 9/14 310/89 |
| 2016/0072369 A1 | 3/2016 | Oowatari | | |

FOREIGN PATENT DOCUMENTS

| | | | | |
|---|---|---|---|---|
| EP | 3118605 A1 * | 1/2017 | .............. | G01L 3/04 |
| JP | 2008011661 * | 1/2008 | .............. | H02K 5/10 |
| JP | 2016-059133 | 4/2016 | | |
| JP | 2016-174443 | 9/2016 | | |

OTHER PUBLICATIONS

Machine translation of JP2008011661, Sakuma et al. (Year: 2008).*

* cited by examiner

*Primary Examiner* — Terrance L Kenerly
(74) *Attorney, Agent, or Firm* — Amin, Turocy & Watson, LLP

(57) ABSTRACT

A rotary electric machine system includes a rotary electric machine, a housing for housing the rotary electric machine, and a rotation parameter detector for detecting the rotation parameter of a rotating shaft constituting the rotary electric machine. The rotating shaft includes a first end portion and a second end portion, and a first bearing and a second bearing are provided between the housing and the first end portion, and between the housing and the second end portion, respectively. The first end portion includes a protruding tip that protrudes out of the housing through the first bearing. The rotation parameter detector is provided at the protruding tip.

7 Claims, 9 Drawing Sheets

ROTARY ELECTRIC MACHINE SYSTEM

CROSS-REFERENCE TO RELATED APPLICATIONS

This application is based upon and claims the benefit of priority from Japanese Patent Application No. 2021-017049 filed on Feb. 5, 2021, the contents of which are incorporated herein by reference.

BACKGROUND OF THE INVENTION

Field of the Invention

The present invention relates to a rotary electric machine system provided with a rotary electric machine and a housing that houses the rotary electric machine.

Description of the Related Art

A rotary electric machine is provided with a rotor including a rotating shaft holding permanent magnets, and a stator including an electromagnetic coil. As shown in FIG. 1 of JP 2016-174443 A, the rotating shaft is rotatably supported, through bearings, in a housing in which a stator is housed. When a current generated in the electromagnetic coil in accordance with the rotation of the rotor is taken out, the rotary electric machine is an electric generator. On the other hand, when power is obtained from the rotating shaft which rotates when an electric current is supplied to the electromagnetic coil, the rotary electric machine is a motor.

The housing is provided with a connector for electrically connecting an external device for transferring and receiving electric power to and from the rotary electric machine (see JP 2016-059133 A). When an electric current flows through the electromagnetic coil or a terminal or the like in the connector, the electromagnetic coil or the terminal is heated. Due to this heat, the conversion efficiency from electrical energy to thermal energy is reduced. Similarly, the conversion efficiency from thermal energy to electrical energy is reduced. JP 2016-174443 A and JP 2016-059133 A have proposed a cooling structure for avoiding this problem.

SUMMARY OF THE INVENTION

Incidentally, the rotary electric machine is provided with a rotation parameter detector. The rotation parameter detector detects a rotation parameter such as rotational speed, a rotational angle or the number of rotations of the rotating shaft. When the rotor of the rotary electric machine rotates, vibration is generated. If this vibration affects the rotation parameter detector, there is a concern that the detection result of the rotation parameter may not be accurate.

It is a main object of the present invention to provide a rotary electric machine system capable of accurately detecting a rotation parameter of a rotating shaft.

It is another object of the present invention to provide a rotary electric machine system with which maintenance of a rotation parameter detector is easily performed.

According to one embodiment of the present invention, provided is a rotary electric machine system comprising: a rotary electric machine that includes a rotor including a rotating shaft, and a stator including an electromagnetic coil; a housing configured to house the rotary electric machine; and a rotation parameter detector configured to detect a rotation parameter of the rotating shaft, wherein the rotating shaft includes a first end portion and a second end portion, and by disposing a first bearing between the housing and the first end portion, and disposing a second bearing between the housing and the second end portion, the rotating shaft is rotatably supported in the housing via the first bearing and the second bearing, the first end portion includes a protruding tip that protrudes out of the housing through the first bearing, and the rotation parameter detector is provided at the protruding tip.

Note that the "rotation parameter detector" is defined as a device for detecting a rotation parameter such as a rotation angle, rotation speed, or the number of rotations. The rotation parameter detector is a device for directly detecting, for example, the number of rotations or a rotation angle. Alternatively, the rotation parameter detector may be a device for obtaining the number of rotations by calculation after detecting the rotation angle.

In the present invention, the rotation parameter detector detects a rotation parameter of the rotating shaft constituting the rotary electric machine. In accordance with the present invention, the rotation parameter detector is provided on the protruding tip of the rotating shaft that is exposed from the housing. In other words, the rotation parameter detector is provided outside the housing that houses the rotary electric machine. Therefore, the rotation parameter detector is hardly affected by the vibration generated by the rotation of the rotating shaft. Therefore, the rotation parameter detector can accurately detect the rotation parameter of the rotating shaft.

In addition, the rotation parameter detector is disposed outside the housing. Therefore, maintenance of the rotation parameter detector can be performed more easily than when the rotation parameter detector is disposed inside the housing.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Hereinafter, a preferred embodiment of a rotary electric machine system according to the present invention will be described in detail with reference to the accompanying drawings. In the following description, "left", "right", "lower" and "upper" refer to the left side, right side, lower side, and upper side in FIGS. 2 to 9, respectively. However, these directions are for convenience in order to simplify the description and to facilitate understanding. That is, the directions indicated in the specification are not necessarily the directions for the case when the rotary electric machine system is actually used.

Figure 1:
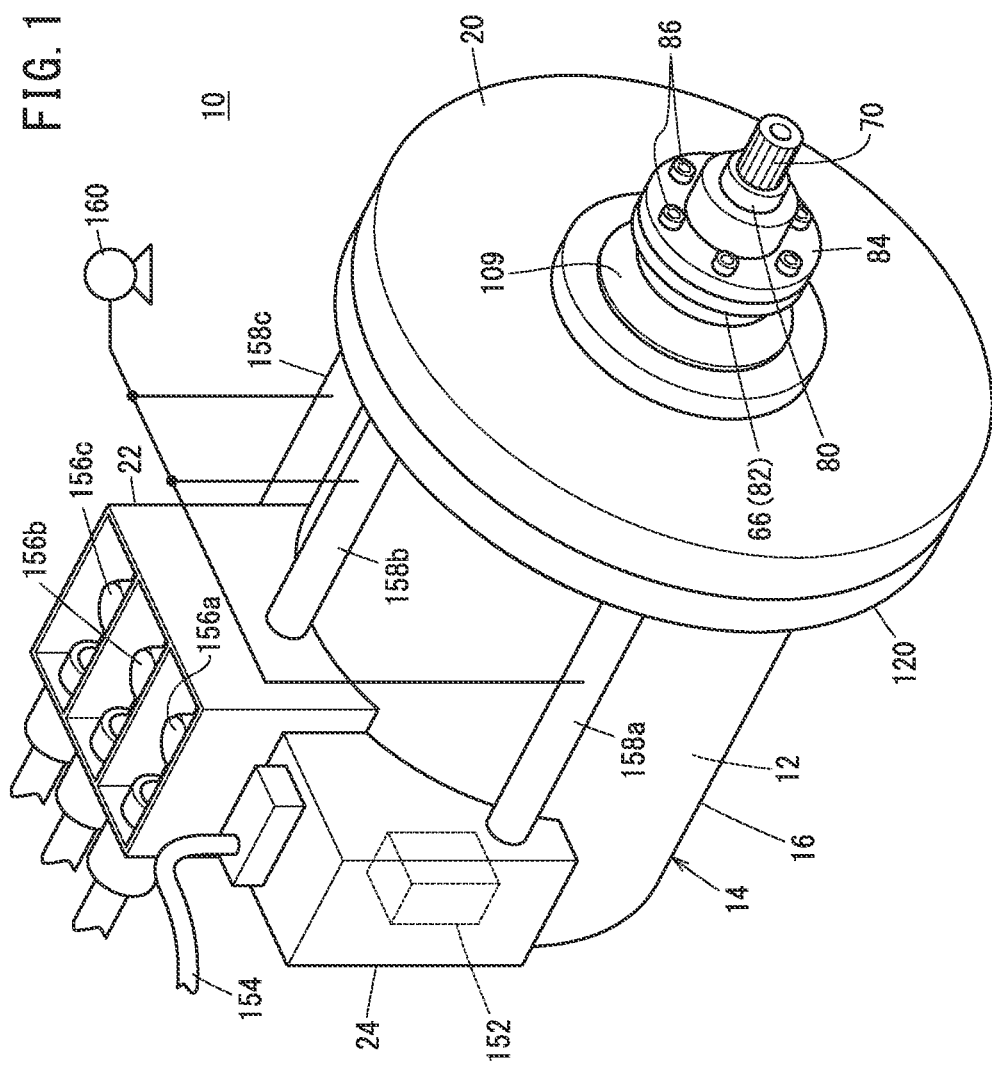
FIG. 1 is a schematic overall perspective view of a rotary electric machine system according to an embodiment of the present invention.
Figure 2:
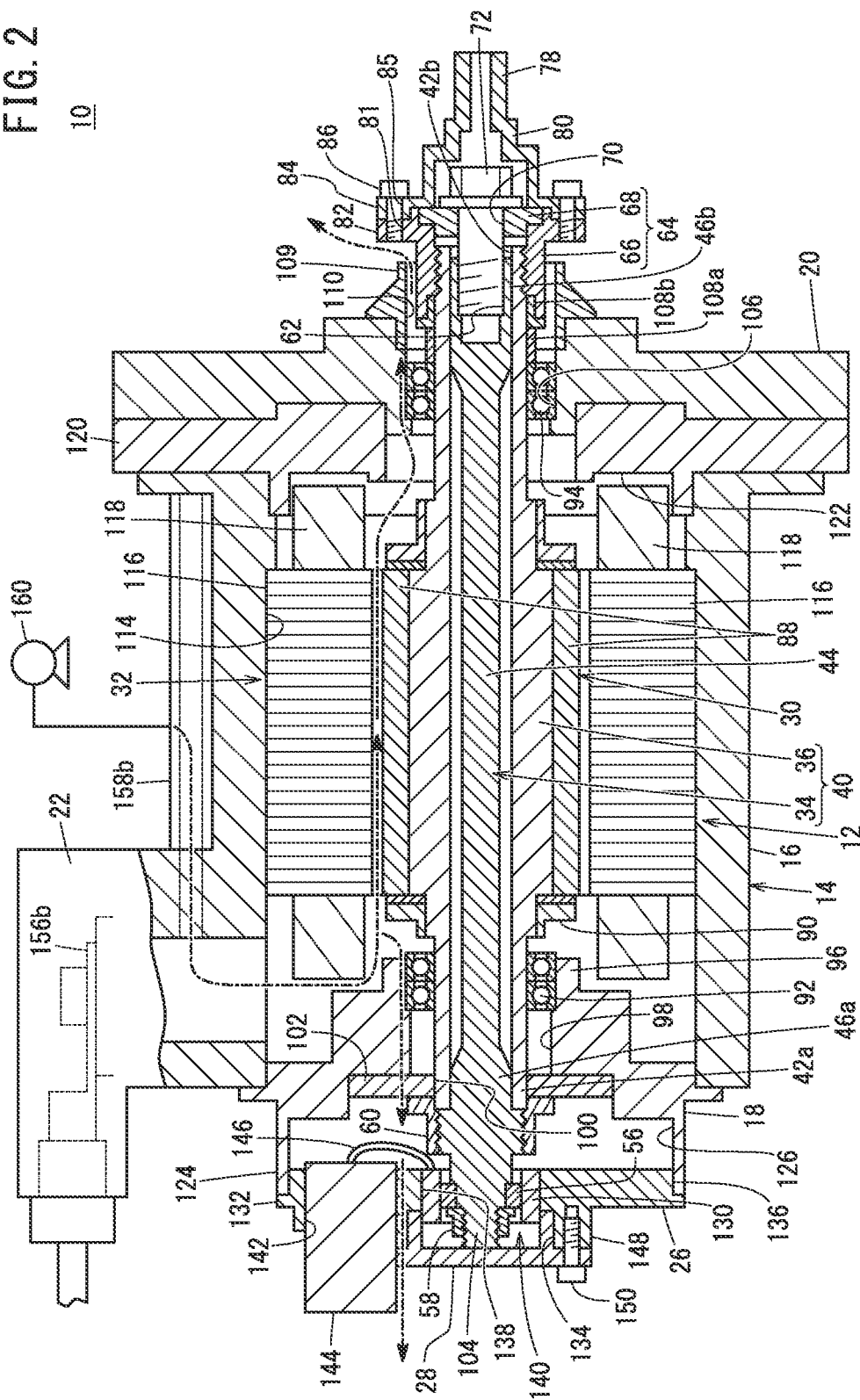
FIG. 2 is a schematic side sectional view showing gas flow routes in the rotary electric machine system.

FIG. 1 is a schematic overall perspective view of a rotary electric machine system 10 according to the present embodiment. FIG. 2 is a schematic side sectional view of the rotary electric machine system 10. The rotary electric machine system 10 includes a rotary electric machine 12 (for example, an electric generator), and a housing 14 that houses the rotary electric machine 12.

The housing 14 includes a main housing 16, a first sub-housing 18, and a second sub-housing 20. The main housing 16 has a substantially cylindrical shape and both ends thereof are open ends. The first sub-housing 18 is connected to the left end of the main housing 16. The second sub-housing 20 is connected to the right end of the main housing 16. On the side wall of the main housing 16, a terminal casing 22 and a measuring instrument casing 24 are provided integrally with the main housing 16. A resolver holder 26 serving as a detector holding member is connected to the first sub-housing 18. A cap cover 28 is screwed to the resolver holder 26. These will be described later.

The rotary electric machine 12 will be described in detail. The rotary electric machine 12 is provided with a rotor 30, and a stator 32 which surrounds the outer periphery of the rotor 30.

The rotor 30 includes a rotating shaft 40. The rotating shaft 40 is formed by inserting an inner shaft 34 into a hollow cylindrical outer shaft 36. Specifically, the outer shaft 36 is a hollow body having a substantially cylindrical shape. Both ends of the outer shaft 36 are open ends. That is, the outer shaft 36 includes a left opening end 42a (see FIG. 3) and a right opening end 42b (see FIG. 4).

Figure 3:
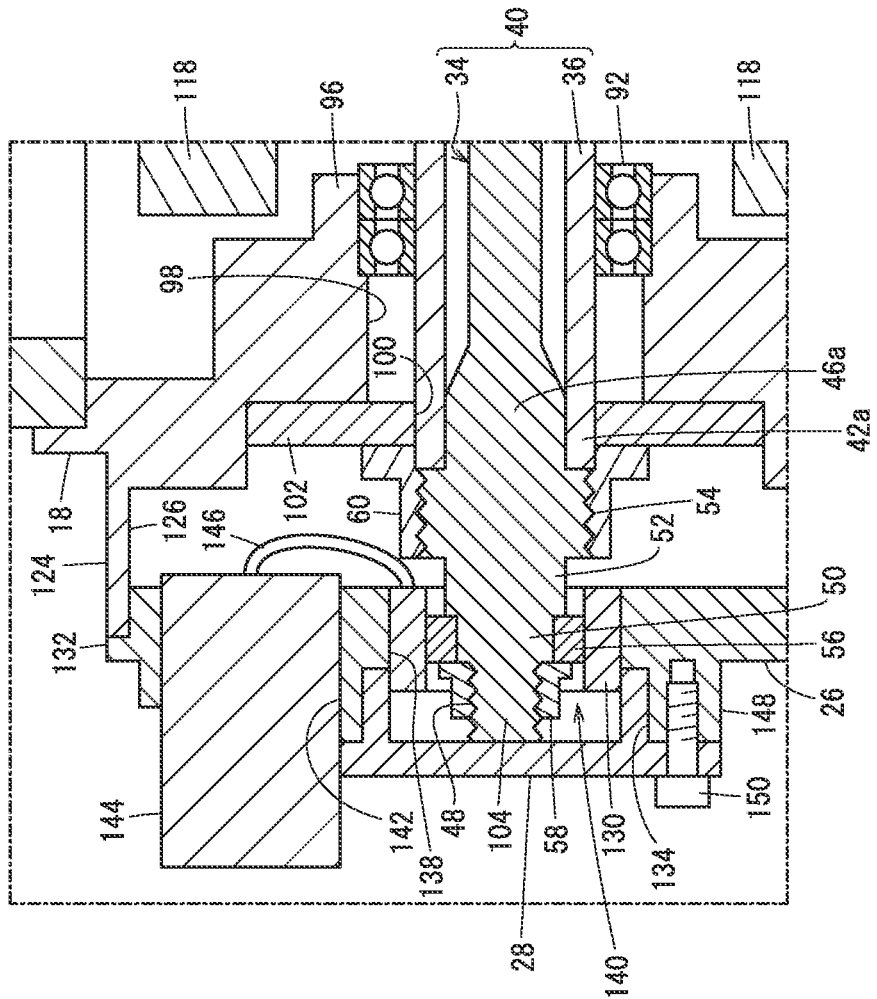
FIG. 3 is an enlarged view of the main part of a portion in FIG. 2.
Figure 4:
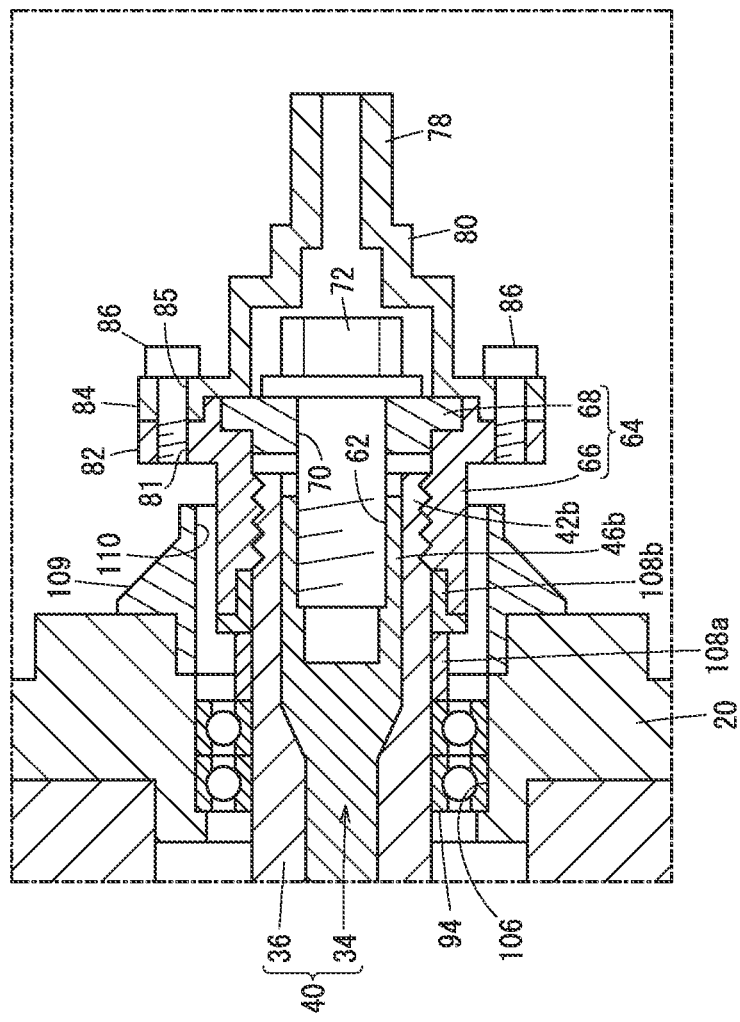
FIG. 4 is an enlarged view of the main part of a portion different from that of FIG. 3.

The inner shaft 34 is longer than the outer shaft 36, and includes a columnar portion 44, a left end portion 46a (see FIG. 3), and a right end portion 46b (see FIG. 4). The columnar portion 44 has the smallest diameter among the portions of the inner shaft 34. The left end portion 46a (see FIG. 3) is continuous with the left side of the columnar portion 44. The diameter of the left end portion 46a is larger than that of the columnar portion 44. The right end portion 46b (see FIG. 4) is continuous with the right side of the columnar portion 44. The diameter of the right end portion 46b is larger than that of the columnar portion 44 and smaller than that of the left end portion 46a.

A part of the left end portion 46a protrudes and is exposed from the left opening end 42a of the outer shaft 36. This part serves as a protruding tip 104 to be described later. The right end portion 46b is located on a slightly inner side than the right opening end 42b of the outer shaft 36.

As shown in detail in FIG. 3, the left end portion 46a of the inner shaft 34 is provided with a first outer threaded portion 48, a flange portion 50, a stopper portion 52, and a second outer threaded portion 54 in this order toward the right. The outer diameters of the first outer threaded portion 48, the flange portion 50, the stopper portion 52, and the second outer threaded portion 54 increase in this order. The outer diameter of the second outer threaded portion 54 is larger than the inner diameter of the outer shaft 36. Therefore, the right end of the second outer threaded portion 54 is stopped by the edge portion of the left opening end 42a of the outer shaft 36. Thus, the inner shaft 34 is prevented from being inserted into the outer shaft 36.

A resolver rotor 56 is mounted on the flange portion 50. A small cap nut 58 is screwed to the first outer threaded portion 48. The right end of the resolver rotor 56 is stopped by the stopper portion 52. The left end of the resolver rotor 56 is pressed by the small cap nut 58. Thus, the resolver rotor 56 is positioned and fixed to the flange portion 50. A large cap nut 60 is screwed to the second outer threaded portion 54. A skirt part of the large cap nut 60 covers the outer peripheral wall of the left opening end 42a of the outer shaft 36. Thus, the left end portion 46a of the inner shaft 34 is restrained by the left opening end 42a of the outer shaft 36.

The first outer threaded portion 48 and the second outer threaded portion 54 are so-called reverse-threaded screws. Accordingly, the small cap nut 58 and the large cap nut 60 are rotated counterclockwise when screwed. It is also preferable to deform a portion of the threads of the small cap nut 58 and a portion of the threads of the large cap nut 60. As a result, the small cap nut 58 and the large cap nut 60 are prevented from being loosened.

As shown in FIG. 4, a bolt receiving hole 62 is formed in the right end portion 46b of the inner shaft 34. The bolt receiving hole 62 extends toward the left end portion 46a. A female threaded portion is formed in the inner peripheral wall of the bolt receiving hole 62. A threaded portion is also formed on the outer peripheral wall of the right opening end 42b of the outer shaft 36. A cylindrical body 66 is screwed to the threaded portion. The cylindrical body 66 constitutes a bolt receiving cap 64 for connecting the right opening end 42b and the right end portion 46b. A disk body 68 is provided in the opening at the right end of the cylindrical body 66. The disk body 68 and the cylindrical body 66 constitute the bolt receiving cap 64. An insertion hole 70 is formed in the disk body 68. A small-diameter shank of a fastening bolt 72 is passed through the insertion hole 70.

A threaded portion formed in the shank of the fastening bolt 72 is screwed into the female threaded portion of the bolt receiving hole 62. A large-diameter head portion of the fastening bolt 72 is stopped by the disk body 68. As a result, the right opening end 42b of the outer shaft 36 and the right end portion 46b of the inner shaft 34 are connected to each other through the bolt receiving cap 64 and the fastening bolt 72. Further, the left end portion 46a of the inner shaft 34 is restrained by the left opening end 42a of the outer shaft 36. For the reasons described above, the inner shaft 34 and the outer shaft 36 can rotate integrally. Incidentally, the fastening bolt 72 is also a so-called reverse-threaded screw.

A rotating cap 80 having a driving force transmission shaft portion 78 is connected to the bolt receiving cap 64. A first outer flange 82 is provided at the right end of the cylindrical body 66. A plurality of screw holes 81 are formed in the first outer flange 82. A second outer flange 84 having substantially the same diameter as the first outer flange 82 is provided at the left end of the rotating cap 80. The second outer flange 84 is formed with passing holes 85, the number and the phase of which are the same as those of the screw holes 81. The threaded portions of connecting bolts 86 are screwed into the screw holes 81 after passing through the passing holes 85. Thus, the rotating cap 80 is connected to the cylindrical body 66.

A predetermined member (not shown), which is a rotating body, is attached to the driving force transmission shaft portion 78. As the inner shaft 34 and the outer shaft 36 rotate integrally, the bolt receiving cap 64 and the rotating cap 80 also rotate integrally. As a result, the predetermined member attached to the driving force transmission shaft portion 78 rotates simultaneously with the rotating shaft 40.

As shown in FIG. 2, the outer diameter of the substantially intermediate portion of the outer shaft 36 in the longitudinal direction is set to be maximum. In this large diameter portion, a plurality of permanent magnets 88 are held by magnet holders 90. The adjacent permanent magnets 88 are separated from each other at a predetermined interval. Further, in the adjacent permanent magnets 88, different polarities face the outer periphery. As the rotating shaft 40 rotates, the individual permanent magnets 88 move on the circumference of an imaginary circle centered on the rotational center of the rotating shaft 40.

The left end (first end portion) of the rotating shaft 40 is rotatably supported in the first sub-housing 18 through a first bearing 92. The right end (second end portion) of the rotating shaft 40 is rotatably supported in the second sub-housing 20 through a second bearing 94. As shown in FIG. 2, in the present embodiment, the first bearing 92 is interposed between the outer shaft 36 and the first sub-housing 18. The second bearing 94 is interposed between the outer shaft 36 and the second sub-housing 20.

The first sub-housing 18 includes a columnar projection 96 protruding toward the main housing 16 and having a substantially columnar shape. A first shaft insertion hole 98 is formed in the columnar projection 96. The first bearing 92 is provided in the first shaft insertion hole 98.

The left opening of the first shaft insertion hole 98 is closed by a disc member 102. A second shaft insertion hole 100 is formed in the disc member 102. The second shaft insertion hole 100 is continuous with the first shaft insertion hole 98. The outer peripheral wall of the left opening end 42a of the outer shaft 36 and the inner peripheral wall of the first shaft insertion hole 98 are separated from each other. The outer peripheral wall of the left opening end 42a of the outer shaft 36 and the inner peripheral wall of the second shaft insertion hole 100 are separated from each other. The skirt part of the large cap nut 60 is slightly separated from the left end surface of the disc member 102.

The tip of the left end portion of the rotating shaft 40 is passed through an inner hole of the first bearing 92. The tip of the left end portion passes through the first shaft insertion hole 98 and the second shaft insertion hole 100 and is exposed to the outside of the first sub-housing 18. Hereinafter, a portion of the rotating shaft 40 that protrudes from the left end of the first bearing 92 will be referred to as a "protruding tip 104". The protruding tip 104 includes the first outer threaded portion 48, the flange portion 50, the stopper portion 52, and the second outer threaded portion 54 in the left end portion 46a of the inner shaft 34 (see FIG. 3).

A third shaft insertion hole 106 is formed in the second sub-housing 20 (see FIG. 4). The second bearing 94 is provided in the third shaft insertion hole 106. The right end of the rotating shaft 40 is passed through an inner hole of the second bearing 94 and slightly protrudes from the third shaft insertion hole 106. As described above, the rotating cap 80 is provided at the protruding right end via the bolt receiving cap 64.

A first stopper member 108a, a second stopper member 108b, and a skirt part of a bearing cover 109 are inserted into the third shaft insertion hole 106. The first stopper member 108a, the second stopper member 108b, and the bearing cover 109 prevent the second bearing 94 from coming off. The first stopper member 108a is prevented from coming off by the second stopper member 108b. Here, the second stopper member 108b is surrounded by the left end of the cylindrical body 66 constituting the bolt receiving cap 64.

The bearing cover 109 is a hollow body having a through hole 110 formed therein. The cylindrical body 66 is inserted into the through hole 110. The outer peripheral wall of the cylindrical body 66 and the inner peripheral wall of the through hole 110 are separated from each other.

As shown in FIG. 2, the first shaft insertion hole 98 and the third shaft insertion hole 106 communicate with a storage chamber 114 (described later) which is an internal space of the main housing 16. Therefore, the first bearing 92 and the second bearing 94 are exposed to the storage chamber 114. The second shaft insertion hole 100 communicates with the storage chamber 114 through the first shaft insertion hole 98.

In the present embodiment, the first bearing 92 and the second bearing 94 are so-called jet-lubricated bearings lubricated and cooled by lubricating oil supplied in a jet-flow manner. It should be noted that the first bearing 92 and the second bearing 94 are not limited to the jet-lubricated bearings. The first bearing 92 and the second bearing 94 may be oil mist-lubricated bearings to which an oil mist is sprayed. Alternatively, the first bearing 92 and the second bearing 94 may be circulating lubrication type bearings. Since the above-described lubrication type bearings are well known, detailed illustration and description thereof will be omitted.

The stator 32 that constitutes the rotary electric machine 12 together with the rotor 30 includes an electromagnetic coil 116 and a plurality of insulating base members 118 around which the electromagnetic coil 116 is wound. The electromagnetic coil 116 has three types: a U-phase coil, a V-phase coil, and a W-phase coil. That is, when the rotary electric machine 12 is an electric generator, the rotary electric machine 12 is a so-called three phase power supply. The plurality of insulating base members 118 are arranged in an annular shape, whereby an inner hole is formed in the stator 32.

The stator 32 is housed in the storage chamber 114 formed in the main housing 16. A stator holder 120 is interposed between the main housing 16 and the second sub-housing 20. The insulating base members 118 constituting the stator 32 is engaged with an annular recess 122 formed in the stator holder 120. By this engagement, the stator 32 is positioned and fixed. The stator holder 120 is preferably an insulator such as a resin material. However, the stator holder 120 may be a conductor such as a metal material. Further, the columnar projection 96 enters the inner hole of the stator 32 from the left opening of the inner hole.

The inner wall of the storage chamber 114 and the electromagnetic coil 116 are slightly separated from each other. This separation electrically insulates the main housing 16 and the electromagnetic coil 116.

Incidentally, the outer peripheral wall of the columnar projection 96 and the insulating base member 118 are slightly separated from each other, whereby a clearance is formed therebetween. The outer wall of the permanent magnet 88 and the inner wall of the electromagnetic coil 116 are slightly separated from each other, whereby a clearance is formed therebetween. As will be described later, the clearances become part of flow paths through which air as a gas flows.

The first sub-housing 18 includes an annular protrusion 124 protruding in an annular shape. The inner side of the annular protrusion 124 is a hollow concave portion 126. The protruding tip 104 constituting the left end portion 46a of the inner shaft 34 enters the hollow concave portion 126.

The annular protrusion 124 is provided with the resolver holder 26 that holds a resolver stator 130. That is, the resolver holder 26 includes a flange-shaped stopper 132 protruding outward in the diametrical direction. The diameter of the flange-shaped stopper 132 is larger than that of the annular protrusion 124. Therefore, the resolver holder 26 is positioned by the flange-shaped stopper 132 abutting against the annular protrusion 124. In this state, the resolver holder 26 is connected to the first sub-housing 18 via a mounting bolt (not shown), for example.

The resolver holder 26 is provided with a small cylindrical portion 134 facing the left and a large cylindrical portion 136 facing the right, with the flange-shaped stopper 132 as a boundary. The diameter of the large cylindrical portion 136 is larger than that of the small cylindrical portion 134. Further, the large cylindrical portion 136 is shorter than the small cylindrical portion 134. A holding hole 138 is formed in the bottom wall portion of the small cylindrical portion 134. The right end of the resolver stator 130 is fitted into the holding hole 138. The resolver stator 130 is held by this fitting. When the large cylindrical portion 136 enters the hollow concave portion 126 and the flange-shaped stopper 132 abuts against the annular protrusion 124, the resolver rotor 56 is located in the inner hole of the resolver stator 130. The resolver rotor 56 is held by the flange portion 50 of the left end portion 46a of the inner shaft 34. The resolver stator 130 and the resolver rotor 56 constitute a resolver 140 serving as a rotation parameter detector. In the present embodiment, a case where the rotation angle is detected by the resolver 140 is exemplified.

A receiver connector 144 is fitted into a fitting hole 142 formed in the flange-shaped stopper 132. The resolver stator 130 and the receiver connector 144 are electrically connected via a signal line 146. A connector of a receiver (not shown) for receiving a signal generated by the resolver 140 is inserted into the receiver connector 144. The resolver 140 and the receiver are electrically connected through the receiver connector 144 and the connector of the receiver.

A plurality of tab portions 148 are radially connected to the small cylindrical portion 134. One of them is shown in FIG. 2. Further, the small cylindrical portion 134 is covered with the cap cover 28 for closing the left opening of the small cylindrical portion 134. The cap cover 28 shields the left end portion 46a of the inner shaft 34. The cap cover 28 is connected to the tab portion 148 via a connecting bolt 150.

As described above, the terminal casing 22 and the measuring instrument casing 24 are integrally provided on the side wall near the left end of the main housing 16. A thermistor 152 serving as a temperature measuring instrument is housed in the measuring instrument casing 24. Although not particularly shown, the measuring terminal of the thermistor 152 is drawn out from the measuring instrument casing 24 and connected to the electromagnetic coil 116. A harness 154 connected to the thermistor 152 is drawn out from the measuring instrument casing 24 to the outside.

A U-phase terminal 156a, a V-phase terminal 156b, and a W-phase terminal 156c are housed in the terminal casing 22 adjacent to the measuring instrument casing 24. The U-phase terminal 156a, the V-phase terminal 156b, and the W-phase terminal 156c are electrically connected to the ends of the U-phase coil, the V-phase coil, and the W-phase coil, respectively. In other words, the terminal casing 22 is an external device connecting connector for electrically connecting an external device to the rotary electric machine 12. The U-phase terminal 156a, the V-phase terminal 156b, and the W-phase terminal 156c are electric terminal portions for supplying electric power to the external device. The internal space of the measuring instrument casing 24 and the internal space of the terminal casing 22 communicate with each other through a communication hole (not shown).

As shown in FIG. 1, hollow tube portions 158a to 158c are formed on the outer side wall of the main housing 16 so as to extend along the longitudinal direction (the left-right direction in FIG. 2) of the main housing 16. The hollow tube portion 158a is connected to the measuring instrument casing 24. The hollow tube portions 158b and 158c are connected to the terminal casing 22.

An air pump 160 is connected to the hollow tube portions 158a to 158c. The air pump 160 supplies air obtained by sucking atmospheric air or the like, to the hollow tube portions 158a to 158c. That is, the air pump 160 is a gas supply source. Further, the hollow tube portions 158a to 158c are part of air flow paths. Air is individually supplied to the hollow tube portions 158a to 158c, for example. Alternatively, air is supplied from the hollow tube portion 158a to the hollow tube portion 158c via the hollow tube portion 158b. In this way, it is possible to supply air to the hollow tube portions 158a to 158c in a sequenced manner.

As shown in FIG. 2, the internal space of the terminal casing 22 communicates with the storage chamber 114. Accordingly, the air flowing into the internal space of the terminal casing 22 can flow into the storage chamber 114 and contact the first bearing 92 and the second bearing 94.

The rotary electric machine system 10 according to the present embodiment is basically configured as described above. Next, the operation and effect of the rotary electric machine system 10 will be described. In the following description, a case where the rotary electric machine 12 is an electric generator is exemplified.

The rotary electric machine system 10 is incorporated into, for example, an internal combustion engine. Further, as described above, a predetermined member is attached to the driving force transmission shaft portion 78. Connection terminals of an external device are connected to the U-phase terminal 156a, the V-phase terminal 156b, and the W-phase terminal 156c in the terminal casing 22. When the internal combustion engine is operated, atmospheric air is drawn in by the air pump 160. This atmospheric air is introduced into the hollow tube portions 158a to 158c as air through a relay tube (not shown). The air pump 160 also supplies air to the internal combustion engine. In this manner, the air pump 160 also serves as an air supply source for the internal combustion engine.

As shown in FIG. 1, the air having flowed through the hollow tube portion 158a flows into the internal space of the measuring instrument casing 24. As a result, an air curtain is formed in the measuring instrument casing 24. Excess air flows into the hollow interior (internal space) of the terminal casing 22 through the communication hole. The excess air, and the air having flowed through the hollow tube portions 158b and 158c and flowing into the internal space of the terminal casing 22 form an air curtain in the terminal casing 22.

As shown in FIG. 2, the excess air in the terminal casing 22 flows into the storage chamber 114 formed in the main housing 16. Since the terminal casing 22 and the measuring instrument casing 24 are disposed on the left side of the main housing 16, the air flows in from the left end of the storage chamber 114. Thereafter, the air first enters the inner hole of the stator 32 (the clearance between the outer peripheral wall of the columnar projection 96 and the insulating base member 118).

A part of the air then flows toward the first shaft insertion hole 98. The remaining air flows along the storage chamber 114 (the clearance between the outer wall of the permanent magnet 88 and the inner wall of the electromagnetic coil 116) toward the third shaft insertion hole 106. In this manner, the air branches into the air toward the first shaft insertion hole 98 located at the left end (first end) and the air toward the third shaft insertion hole 106 located at the right end (second end). As understood from the above, in the air flow paths, the internal spaces of the terminal casing 22 and the measuring instrument casing 24 are on the upstream side. In the air flow paths, the storage chamber 114 of the main housing 16 is on the downstream side.

The air having flowed into the first shaft insertion hole 98 passes through the first bearing 92 disposed in the first shaft insertion hole 98. Thereafter, the air passes between the outer peripheral wall of the left opening end 42a of the outer shaft 36 and the inner peripheral walls of the first shaft insertion hole 98 and the second shaft insertion hole 100. The air further passes through the gap between the skirt part of the large cap nut 60 and the disc member 102, and is discharged into the atmosphere from the hollow concave portion 126. On the other hand, the air having flowed into the third shaft insertion hole 106 passes through the second bearing 94 disposed in the third shaft insertion hole 106. The air then passes between the outer peripheral wall of the cylindrical body 66 and the inner peripheral wall of the through hole 110 of the bearing cover 109. The air is further discharged together with lubricating oil into an oil tank (not shown) through the right opening of the through hole 110. Alternatively, air may be exhausted through a breather.

When the internal combustion engine is operated, the predetermined member attached to the rotating shaft 40 rotates. Accordingly, the rotating shaft 40 rotates integrally. The rotational direction of the predetermined member and the rotating shaft 40 is preferably opposite to the rotational direction when the small cap nut 58, the large cap nut 60, and the fastening bolt 72 are screwed. In this case, the small cap nut 58, the large cap nut 60, and the fastening bolt 72 are prevented from being loosened during the rotation of the rotating shaft 40. It is noted that the small cap nut 58, the large cap nut 60 or the like may be provided with, in advance, a mechanism for preventing the loosening thereof.

The first bearing 92 and the second bearing 94 for rotatably supporting the rotating shaft 40 in the housing 14 are supplied with lubricating oil in a jet-flow manner. As a result, the first bearing 92 and the second bearing 94 are cooled by the lubricating oil. Therefore, it is possible to suppress occurrence of seizure in the first bearing 92 and the second bearing 94. As described above, in the rotary electric machine system 10, the flow paths are formed in which the internal spaces of the terminal casing 22 and the measuring instrument casing 24 are on the upstream side and the first bearing 92 and the second bearing 94 are on the downstream side. Further, the flow paths are each provided with a labyrinth seal structure, and air flows through the labyrinth seal structure. Therefore, it is difficult for the lubricating oil to enter the internal spaces of the terminal casing 22 and the measuring instrument casing 24.

Furthermore, air curtains made of air are respectively formed in the internal spaces of the terminal casing 22 and the measuring instrument casing 24. Accordingly, even if the lubricating oil enters the internal spaces of the terminal casing 22 and the measuring instrument casing 24, the lubricating oil is prevented from adhering to the U-phase terminal 156a, the V-phase terminal 156b, the W-phase terminal 156c, the thermistor 152, and the like. For the reasons described above, it is possible to effectively prevent the electric terminal portions to which an external device is electrically connected, the measuring instrument (thermistor 152), or the like from being contaminated by the lubricating oil.

In addition, in the rotary electric machine system 10, the air that has passed through the first bearing 92 and the second bearing 94 flows so as to be discharged to the outside of the housing 14. Therefore, even if the lubricating oil leaks from the first bearing 92 and the second bearing 94, the lubricating oil is discharged to the outside of the housing 14 together with the air. Therefore, the leaked lubricating oil is prevented from flowing toward the rotor 30. Further, the lubricating oil is also prevented from remaining in the rotor 30.

As the rotating shaft 40 rotates, the plurality of permanent magnets 88 held on the large diameter portion of the outer shaft 36 revolve. As a result, a current is induced in the electromagnetic coil 116 (U-phase coil, V-phase coil, and W-phase coil) facing the permanent magnets 88. This current is taken out as electric power for driving the external device, through the U-phase terminal 156a, the V-phase terminal 156b, and the W-phase terminal 156c.

The electromagnetic coil 116 generates heat as an electric current flows therethrough. Here, the air before branching comes into contact with the left end of the stator 32. In addition, the air flowing in the longitudinal direction toward the third shaft insertion hole 106 through the storage chamber 114 comes into contact with the outer wall and the inner wall of the stator 32. That is, a sufficient amount of air comes into contact with the left end of the stator 32, and the air after branching comes into contact with the stator 32 over the entire outer and inner walls. Accordingly, the stator 32 including the electromagnetic coil 116 is rapidly cooled by the air.

In the present embodiment, the housing 14 (main housing 16) for housing the rotary electric machine 12, and the terminal casing 22 for housing the U-phase terminal 156a, the V-phase terminal 156b, and the W-phase terminal 156c, are separately provided. Therefore, it is unlikely that heat generated in the stator 32 in the main housing 16 affects the U-phase terminal 156a, the V-phase terminal 156b, and the W-phase terminal 156c in the terminal casing 22. The U-phase terminal 156a, the V-phase terminal 156b, and the W-phase terminal 156c also generate heat because the terminals of the external device are connected thereto. However, the U-phase terminal 156a, the V-phase terminal 156b, and the W-phase terminal 156c are rapidly cooled by the air supplied to the terminal casing 22.

In this manner, the air also serves to cool the heat generating portion in the rotary electric machine system 10. Since the electric terminal portions (the U-phase terminal 156a, the V-phase terminal 156b, and the W-phase terminal 156c), the electromagnetic coil 116, and the like are cooled, influence of heat on output control and the like of the rotary electric machine system 10 can be avoided. As a result, the reliability of the rotary electric machine system 10 is improved.

Further, the main housing 16 for housing the rotary electric machine 12, and the terminal casing 22 for housing the U-phase terminal 156a, the V-phase terminal 156b, and the W-phase terminal 156c, are separately provided. Accordingly, the rotary electric machine 12 and the electric terminal portions are separated from each other. Therefore, the U-phase terminal 156a, the V-phase terminal 156b, and the W-phase terminal 156c are hardly affected by vibration generated by the rotation of the rotor 30. In other words, the U-phase terminal 156a, the V-phase terminal 156b, and the W-phase terminal 156c are protected from vibration. Further, as described above, in the first bearing 92 and the second bearing 94, the occurrence of seizure is suppressed by air. Therefore, the rotary electric machine system 10 has excellent durability.

While the rotating shaft 40 is rotating, the rotation angle (rotation parameter) of the rotating shaft 40 is detected by the resolver 140. Specifically, the resolver rotor 56 fitted onto the left end portion 46*a* of the inner shaft 34 rotates integrally with the rotating shaft 40. As a result, an electrical signal is generated in the resolver stator 130. The electrical signal is transmitted to a receiver electrically connected to the receiver connector 144. The receiver that has read the electrical signal calculates the rotation angle of the rotating shaft 40 based on the electrical signal, and sends the result to a control device or the like (not shown). The control device or the like obtains the number of rotations by calculation based on the rotation angle.

The resolver 140 is disposed on the protruding tip 104 of the rotating shaft 40 that is exposed from the housing 14. Therefore, the resolver 140 is hardly affected by heat generated in the electromagnetic coil 116 of the stator 32 in the housing 14. Further, the resolver 140 is hardly affected by vibration caused by the rotation of the rotor 30. In addition, the first bearing 92 and the second bearing 94 for supporting the rotating shaft 40 are provided in the housing 14. Accordingly, by the housing 14, the first bearing 92 and the second bearing 94 are prevented from vibrating. This also makes it difficult for the vibration effect to reach the resolver 140.

As described above, heat, vibration and the like are prevented from being transmitted to the resolver 140. Therefore, the detection result of the rotation angle by the resolver 140 becomes accurate. Also, the life of the resolver 140 is prolonged.

Figure 5:
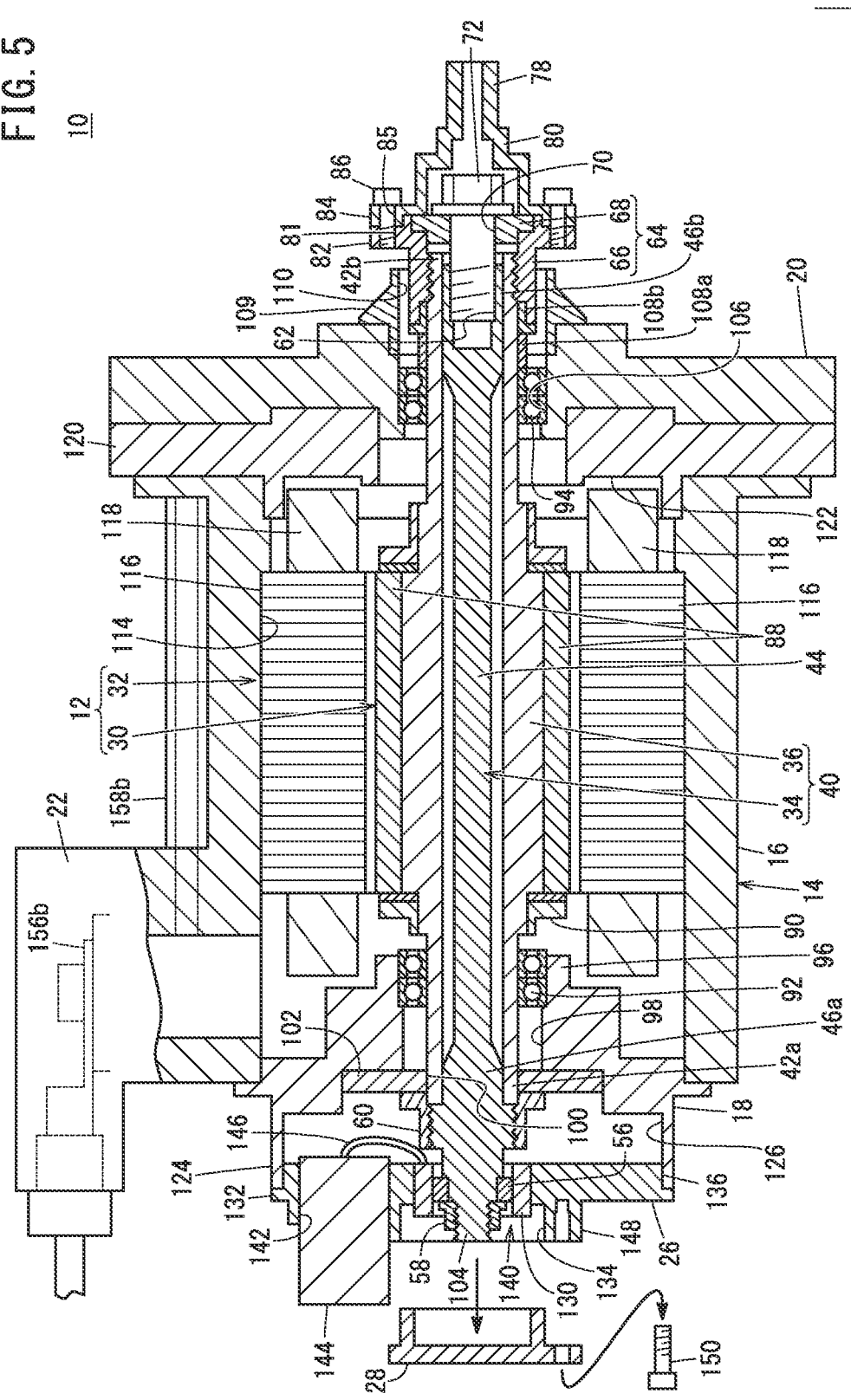
FIG. 5 is a schematic side sectional view showing a state in which a cap cover is removed from FIG. 2.
Figure 6:
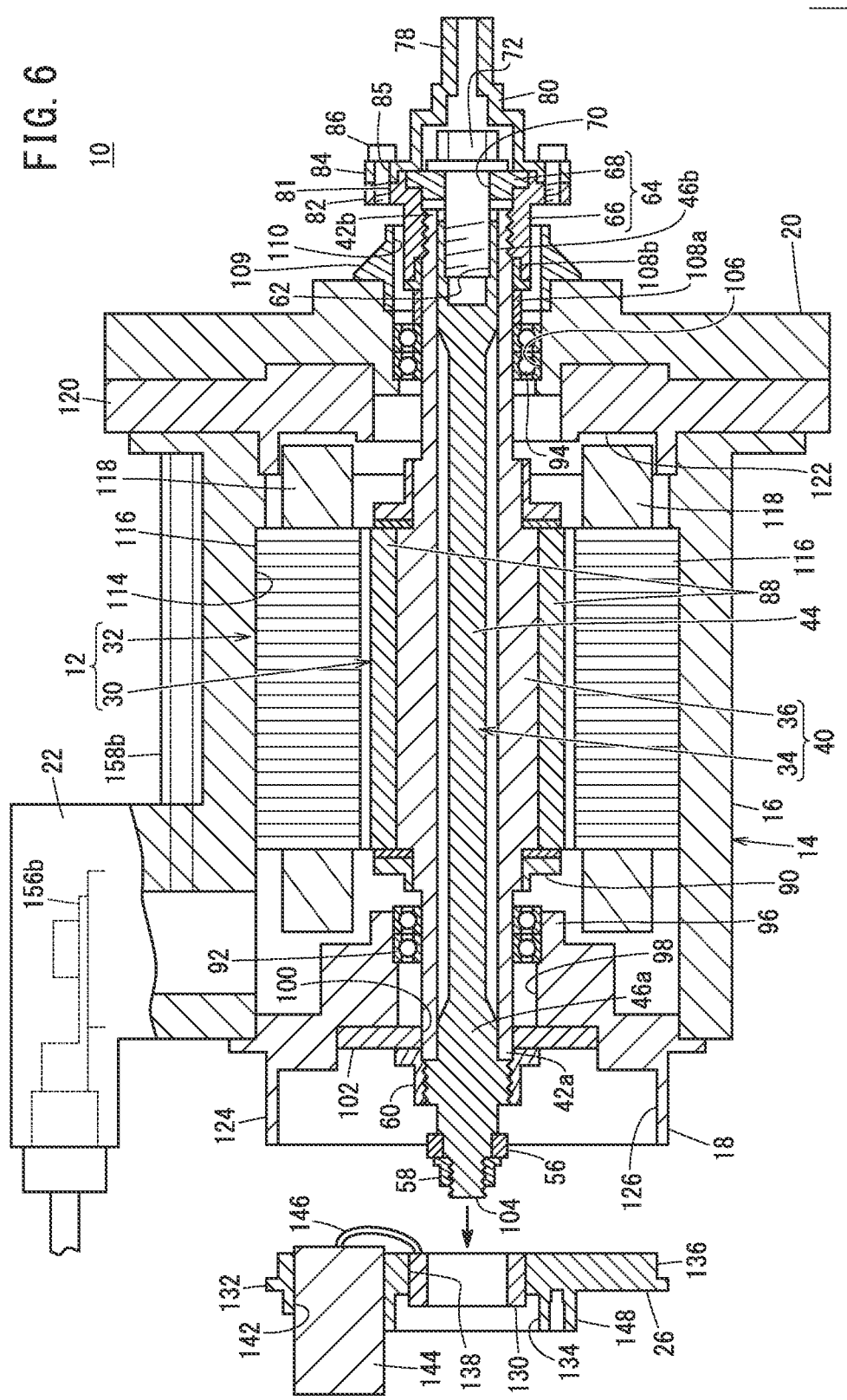
FIG. 6 is a schematic side sectional view showing a state in which a resolver holder holding a resolver stator constituting a rotation parameter detector is removed from FIG. 5.

When maintenance is required for the resolver 140, the rotary electric machine 12, or the like, such as after a long term use of the rotary electric machine system 10, the rotating shaft 40 is removed from the housing 14 in the following manner. Specifically, first, as shown in FIG. 5, the connecting bolt 150 is loosened and the cap cover 28 is removed from the resolver holder 26. Next, the mounting bolt is loosened. Thus, the resolver holder 26 is released from the restraint of the first sub-housing 18. Accordingly, as shown in FIG. 6, the resolver holder 26 can be detached from the first sub-housing 18. This detachment exposes the small cap nut 58 and the resolver rotor 56.

When it is necessary to replace the resolver 140, in this state, the small cap nut 58 is loosened to remove the resolver stator 130 from the resolver holder 26, or remove the resolver rotor 56 from the inner shaft 34. Thus, in the present embodiment, it is easy to perform maintenance on the resolver 140. This is because the resolver 140 is disposed on the protruding tip 104 of the rotating shaft 40 that is exposed from the main housing 16 beyond the first bearing 92.

Figure 7:
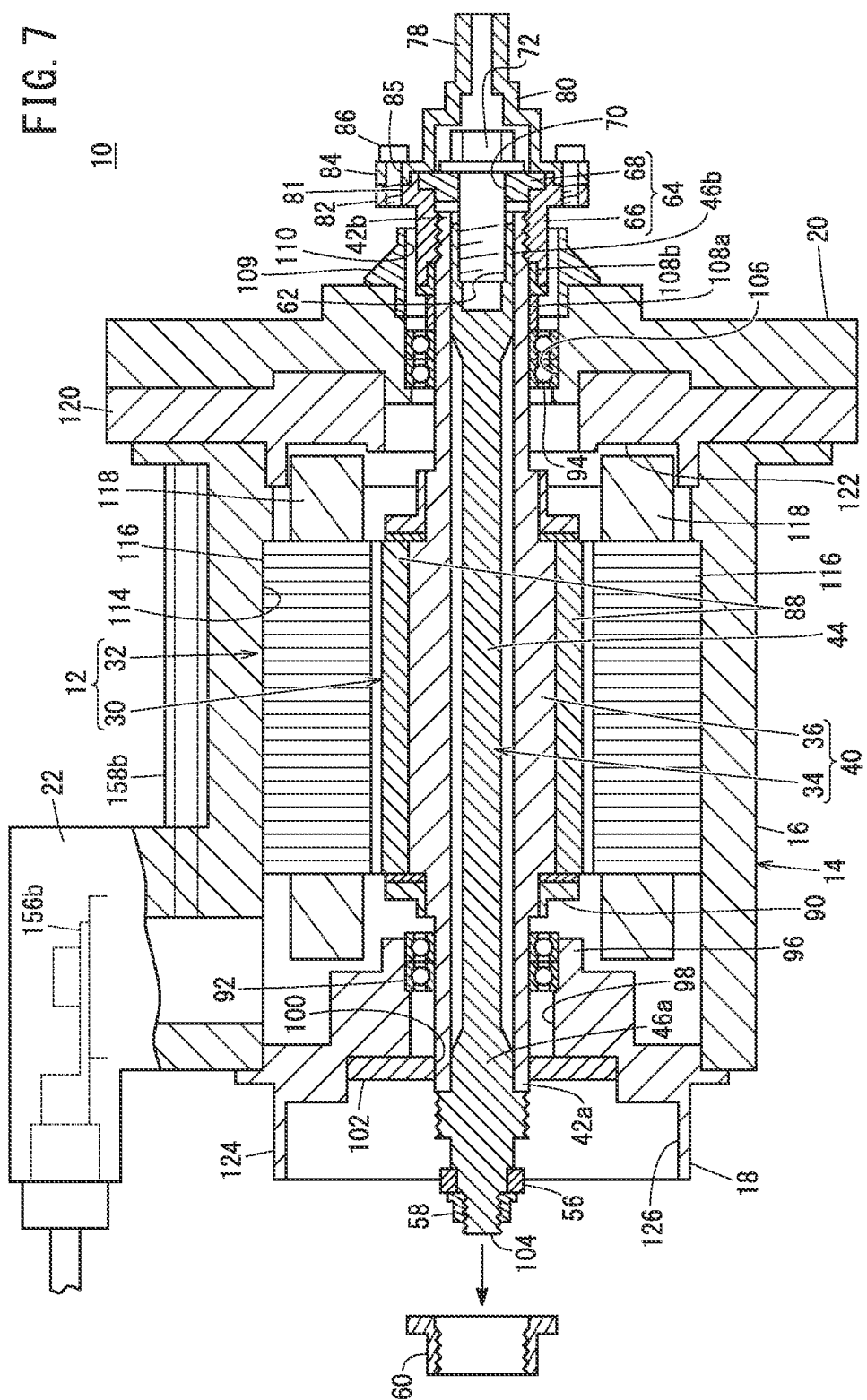
FIG. 7 is a schematic side sectional view showing a state in which a large cap nut is removed from FIG. 6.
Figure 8:
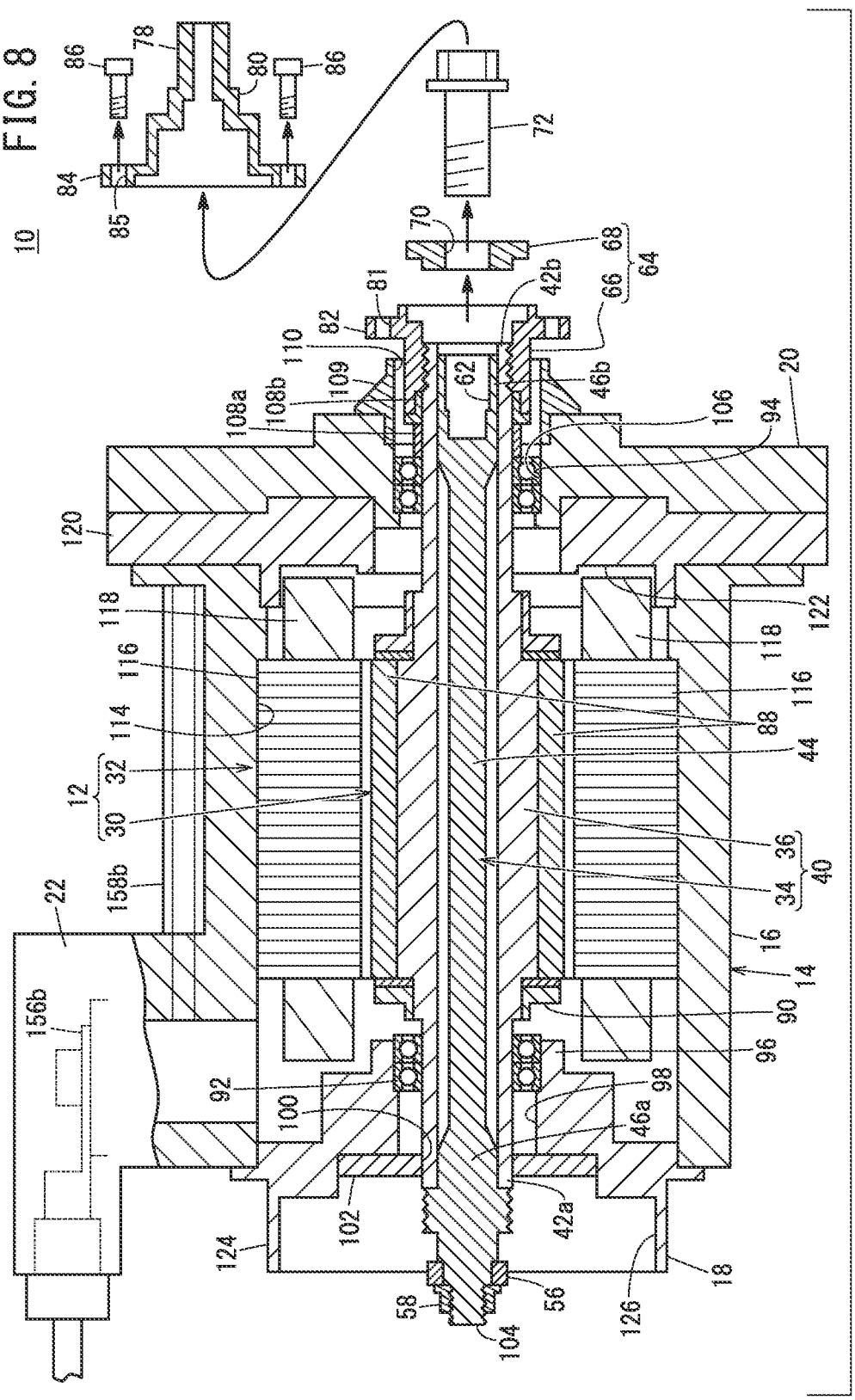
FIG. 8 is a schematic side sectional view showing a state in which a rotating cap is removed from FIG. 7.

If it is necessary to pull the inner shaft 34 out of the outer shaft 36, as shown in FIG. 7, the large cap nut 60 is loosened and detached from the left end portion 46*a* of the inner shaft 34. As a result, the left end portion 46*a* of the inner shaft 34 is released from the restraint of the left opening end 42*a* of the outer shaft 36. On the other hand, the connecting bolts 86 are loosened, and as shown in FIG. 8, the rotating cap 80 is detached from the cylindrical body 66. Further, the fastening bolt 72 is loosened to detach the fastening bolt 72 and the disk body 68 from the cylindrical body 66. As a result, the connection between the right opening end 42*b* of the outer shaft 36 and the right end portion 46*b* of the inner shaft 34 is released. It is noted that the operation shown in FIG. 8 may be performed first, and then the operations shown in FIGS. 5 to 7 may be performed sequentially.

Figure 9:
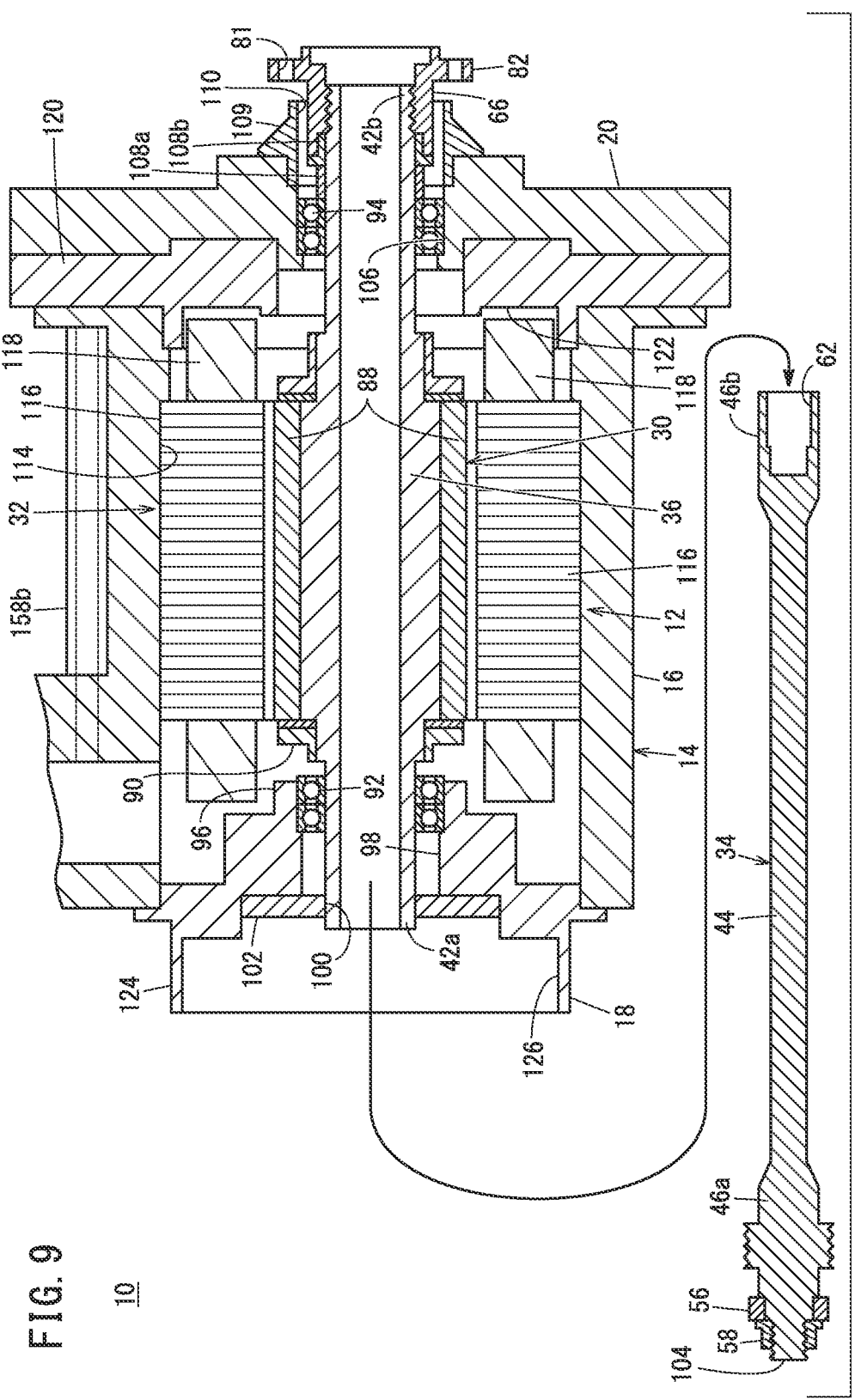
FIG. 9 is a schematic side sectional view showing a state in which an inner shaft is detached from an outer shaft in FIG. 8.

As a result of the above operations, the inner shaft 34 is released from the restraint of the outer shaft 36. Accordingly, by pulling the left end portion 46*a* of the inner shaft 34 exposed from the left opening end 42*a* of the outer shaft 36, the inner shaft 34 is pulled out from the outer shaft 36 as shown in FIG. 9.

For example, when the resolver 140 is replaced by a resolver having larger inner and outer diameters, the inner shaft 34 is replaced by an inner shaft in which the left end portion 46*a* has a larger diameter. In the case where one solid rotating shaft is employed as the rotating shaft 40, in order to cope with the replacement of the resolver 140 with a resolver having large inner and outer diameters, the solid rotating shaft is replaced by a solid rotating shaft having a large diameter. In this case, it may be difficult to pass the solid rotating shaft through the first bearing 92 or the second bearing 94. As can be seen from this, it is preferable that the rotating shaft 40 is constituted by the outer shaft 36 and the inner shaft 34, the outer shaft 36 is passed through the first bearing 92 and the second bearing 94, and the resolver rotor 56 is disposed at a portion of the inner shaft 34 that is exposed from the outer shaft 36. In this case, by replacing the inner shaft 34, it is possible to cope with resolvers 140 having various inner and outer diameters.

The present invention is not limited to the above-described embodiment, and various configurations can be adopted therein without departing from the gist of the present invention.

For example, it is not particularly necessary to incorporate the rotary electric machine system 10 into an internal combustion engine.

In the present embodiment, the case where uncompressed air is supplied to the rotary electric machine 12 is exemplified. However, compressed air may be supplied to the rotary electric machine 12. Further, instead of supplying air from the air pump, air or compressed air from an internal combustion engine may be supplied. Further, the gas is not particularly limited to air. The gas may be an inert gas such as nitrogen.

Although the resolver 140 is employed as the rotation parameter detector in the present embodiment, it is also possible to employ a detector including a Hall element.

It is also possible to cause gas to flow through the internal space of the measuring instrument casing 24 and then flow through the internal space of the terminal casing 22. Alternatively, it is also possible to separately supply gas to the measuring instrument casing 24 and the terminal casing 22, and then cause the gas that has flowed through the internal space of the measuring instrument casing 24 and the gas that has flowed through the internal space of the terminal casing 22 to separately flow to the storage chamber 114.

The rotary electric machine 12 constituting the rotary electric machine system 10 may be a motor in which the rotating shaft 40 rotates by energization of the electromagnetic coil 116. In this case, the U-phase terminal 156*a*, the V-phase terminal 156*b*, and the W-phase terminal 156*c* serve as electric terminal portions for receiving electric power from an external device. A suitable example of the predetermined member attached to the driving force transmission shaft portion 78 includes a drive shaft or the like.

What is claimed is:

1. A rotary electric machine system comprising:
    a rotary electric machine that includes a rotor including a rotating shaft, and a stator including an electromagnetic coil;

a housing configured to house the rotary electric machine;
a combinative rotation parameter detector configured to detect a rotation parameter of the rotating shaft; and
wherein
the rotating shaft includes a first end portion and a second end portion, and by disposing a first bearing between the housing and the first end portion, and disposing a second bearing between the housing and the second end portion, the rotating shaft is rotatably supported in the housing via the first bearing and the second bearing,
the first end portion includes a protruding tip that protrudes out of the housing through the first bearing, and
the rotary electric machine system further comprises
a detector holding member that is separate from the housing and is detachably attached to the housing, and
a connector,
the combinative rotation parameter detector includes
a first element that is provided at the protruding tip, and
a second element that is provided at the detector holding member and is electrically connected with the connector,
when the detector holding member is detached from the housing, the first bearing is located between the housing and the first end portion,
the detector holding member includes
an opening at which part of the protruding tip is located when the detector holding member is attached to the housing, and
a hole that holds the connector,
part of the connector held by the detector holding member is located, together with another part of the protruding tip, in an internal space formed by the housing and the detector holding member,
the rotary electric machine system includes a cover that is detachably attached to the detector holding member and closes the opening, and
the connector and the second element of the combinative rotation parameter detector remain held by the detector holding member when the cover is detached from the detector holding member.

2. The rotary electric machine system according to claim 1, wherein
the connector is a receiver connector configured to electrically connect the second element of the combinative rotation parameter detector and a receiver configured to receive a signal generated by the second element.

3. The rotary electric machine system according to claim 1, wherein the combinative rotation parameter detector is a resolver including a resolver rotor and a resolver stator, and the resolver rotor is fitted onto the protruding tip.

4. The rotary electric machine system according to claim 1, further comprising a terminal casing configured to house electric terminal portions configured to transfer and receive electric power between the rotary electric machine and an external device, wherein
the terminal casing is provided on a side wall of the housing.

5. The rotary electric machine system according to claim 4, further comprising a measuring instrument casing disposed adjacent to the terminal casing and configured to house a temperature measuring instrument configured to measure a temperature of the rotary electric machine.

6. The rotary electric machine system according to claim 1, wherein
the rotating shaft includes an outer shaft having a hollow cylindrical shape, and an inner shaft inserted into the outer shaft so as to be insertable and removable, and
one end portion of the inner shaft is exposed from the outer shaft to form the protruding tip.

7. The rotary electric machine system according to claim 1, wherein
the housing includes
an annular protrusion protruding in annular shape, and
a hollow concave portion formed on an inner side of the annular protrusion, and
the detector holding member
includes a flange-shaped stopper and
becomes a lid that covers the hollow concave portion when the stopper abuts against the annular protrusion.

* * * * *